United States Patent [19]

Dabrowski

[11] Patent Number: 5,635,696
[45] Date of Patent: Jun. 3, 1997

[54] CURRENCY ACCEPTOR WITH MAGNETIC CARD READER

[76] Inventor: Stanley P. Dabrowski, 8068 W. Sahara, Suite B, Las Vegas, Nev. 89117

[21] Appl. No.: 81,470

[22] Filed: Jun. 22, 1993

[51] Int. Cl.⁶ ............................................. G06K 7/08
[52] U.S. Cl. ................... 235/449; 235/381; 194/206; 194/351; 902/23
[58] Field of Search ..................... 235/449, 380, 235/381, 435; 194/206, 207, 351; 902/9, 12, 23

[56] References Cited

U.S. PATENT DOCUMENTS

| | | | |
|---|---|---|---|
| 3,783,989 | 1/1974 | Jensen | 194/351 X |
| 4,348,656 | 9/1982 | Gorgone et al. | 194/213 X |
| 4,598,810 | 7/1986 | Shore et al. | 235/381 X |
| 4,883,948 | 11/1989 | Sunyich | 235/382 |
| 5,038,022 | 8/1991 | Lucero | 235/375 X |
| 5,092,445 | 3/1992 | Kozima | 194/206 |
| 5,225,977 | 7/1993 | Hooper et al. | 235/375 X |
| 5,239,480 | 8/1993 | Huegel | 235/381 X |
| 5,409,092 | 4/1995 | Itako et al. | 235/381 |

*Primary Examiner*—John Shepperd
*Attorney, Agent, or Firm*—John Edward Roethel

[57] ABSTRACT

A combined currency acceptor and magnetic card reader for receiving and validating currency and for receiving and reading a magnetic card comprises an acceptor main body including a mounting plate for attaching the combined currency acceptor and magnetic card reader to a gaming machine. The main body has a gate housing attached to the mounting plate and a currency gate is movable by a solenoid and mounted in the gate housing. A display housing is attached the gate housing and including a currency opening, a magnetic card opening and a light emitting diode display to display to the user of the operating condition of the device. A motor and belt drive assembly is provided for driving the currency into the main body and a solenoid in the currency gate is activated to close the magnetic card opening when currency is being inserted. The same motor and a drive wheel drives the magnetic card into the magnetic card reader and the same solenoid in the gate housing is activated to close the magnetic card opening when the magnetic card is read as valid.

2 Claims, 4 Drawing Sheets

CURRENCY ACCEPTOR WITH MAGNETIC CARD READER

This invention relates to a universal currency acceptor, and more particularly to a currency acceptor that incorporates a magnetic card reader that works separately or in conjunction with a currency acceptor.

BACKGROUND OF THE INVENTION

Currency acceptors have been utilized for many years in both vending machines and gaming devices. Paper currency is inserted by the user into the currency acceptor to activate the vending machine to vend articles or to activate a gaming machine to allow the user to participate in a game of chance.

A typical currency acceptor uses one or more drive belts connected to a drive motor to pull the paper currency into and through the currency acceptor. On the interior of the currency acceptor is located a sensor which reads the printing on the face of the currency. The printing is read along a narrow track running the length of the currency. The width of this track is determined by the width of the sensor. Usually, a light sensitive sensor is used which includes not only a light source that transmits light that bounces off or passes through the paper currency but also a receiver that detects the reflection or transmission of the light, as the case may be.

As the currency passes under the sensor, the sensor detects the locations on the face of the currency that are either printed or unprinted. The sensor converts these readings into digital signals which are then compared to the valid readings that are stored in a microchip that forms part of the currency acceptor. If the digital signals favorably compare to what is stored in memory, then the paper currency is validated and the vending machine or gaming device is activated for use. If the digital signals do not favorably compare, then the paper currency is rejected by reversing the drive motor and the drive belts to fed the paper currency back out of the acceptor.

Many electronic gaming devices also are interconnected to magnetic card reader systems. Typically a side box is connected to the gaming machine and the side box includes a magnetic card reader that is electronically interconnected to the gaming machine and is used as a player tracking system. Many gaming establishments issue player identification cards to their patrons and these player identification cards are used in the player tracking system. For example, a player inserts his player identification card into the magnetic card reader mounted on the side of the gaming machine. The magnetic card reader reads the player identification card and a screen display on the gaming machine recognizes the player. As the player uses the gaming machine, electronic signals are sent through a computer network to the computer system database operated by the gaming establishment to keep track of the amount of play of the gaming machine by the player. In many gaming establishments, players earn credits based on the amount of gaming machine play. These credits are redeemable in many different formats such as cash, gifts, complimentary rooms and meals and other benefits.

Most player tracking systems use plastic identity cards with a magnetic strip thereon. Each gaming establishment issues cards that are unique to its establishment and only accrue credits when used in that particular gaming establishment. The major drawback of these player tracking systems is that the side box that is mounted on the side of the gaming machine has only a single purpose application—reading a magnetic player identity card and tracking the gaming play of that player.

As the gaming business moves away from the use of coins and tokens, currency acceptors have become increasingly desirable as part and parcel of a gaming machine. These currency acceptors allow the player to insert paper currency to operate the gaming machine. Typically, currency acceptors are incorporated into a gaming machine either as an integrated component of the gaming machine or as a side box electronically connected to the gaming machine. Representative of the side box technology is the MoneyMaker® currency acceptor manufactured by Sevens Unlimited, Inc., Las Vegas, Nev.

These currency acceptors also have a single purpose application which is to accept currency inserted by the player and provide the player with credits on the credit meter of the gaming machine that the player can use to operate the gaming machine. Any gaming machine that has a side box currency acceptor and a side box player tracking magnetic card reader is a quite cumbersome arrangement and requires multiple electronic interconnections to function properly.

Thus, there is a need in the gaming business for a currency acceptor that includes a magnetic card reader so that both currency acceptance functions and player tracking functions can be performed in the same unit.

Currency acceptors are also widely used in the vending business. As the variety of vended articles expands, the price of these vended articles often exceeds the small amounts of loose change that many people carry. The use of currency acceptors in vending machines allows paper currency to be used to purchase the vended articles. Plastic identity cards using a magnetic strip for identification or the tracking of purchases can be quite useful in the vending machine business. Operators could reward frequent users of the vending machine by providing bonus points or complimentary gifts and other incentives and the plastic identity card could be used to track these frequent users. It may also be desirable to limit access to certain vending machines to authorized persons and a plastic identity card could be issued to selected persons and required to be inserted into the vending machine before the vending function would be operable. Many hotels and resorts could issue plastic identity cards to their guests which allow use of the vending machines, perhaps at a discounted price than that available to the general public.

Thus, there is a need in the vending machine business for a currency acceptor that includes a magnetic card reader so that both currency acceptance functions and vending use functions can be performed in the same unit.

It is an object of the present invention to provide a combined currency acceptor and magnetic card reader that utilizes the same size and space as a conventional currency acceptor.

It is a feature of the present invention to provide a combined currency acceptor and magnetic card reader that has a drive mechanism for receiving currency and a drive mechanism for receiving magnetic cards, both operated by the same drive motor. The combined currency acceptor and magnetic card reader includes multiple sensors that detect the presence of both currency and a magnetic card and operates a currency gate to control the receiving of the currency.

It is an advantage of the present invention that player tracking systems using a magnetic card can be combined into a currency acceptor and incorporated into a gaming machine in no more space than is currently used by a currency acceptor alone.

Other objects, features and advantages of the present invention will become apparent from a consideration of the following detailed description.

SUMMARY OF THE INVENTION

A combined currency acceptor and magnetic card reader for receiving and validating currency and for receiving and reading a magnetic card comprises an acceptor main body including a mounting plate for attaching the combined currency acceptor and magnetic card reader to a gaming machine. The main body has a gate housing attached to the mounting plate and a currency gate is movable by a solenoid and mounted in the gate housing. A display housing is attached the gate housing and including a currency opening, a magnetic card opening and a light emitting diode display to display to the user of the operating condition of the device. A motor and belt drive assembly is provided for driving the currency into the main body and a solenoid in the currency gate is activated to close the magnetic card opening when currency is being inserted. The same motor and a drive wheel drives the magnetic card into the magnetic card reader and the same solenoid in the gate housing is activated to close the magnetic card opening when the magnetic card is read as valid.

DETAILED DESCRIPTION OF THE PREFERRED EMBODIMENTS

Figure 1:
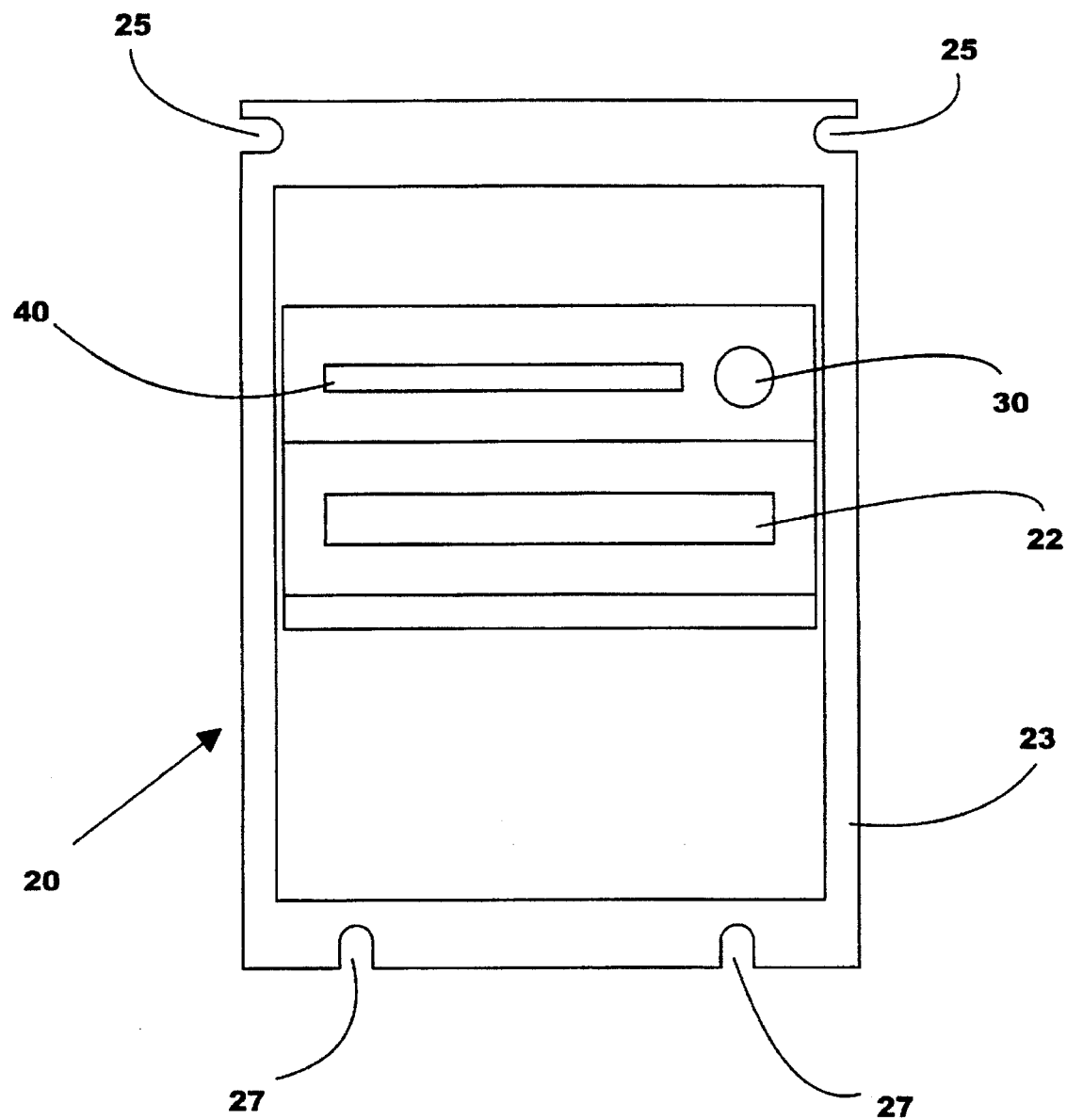
FIG. 1 shows the front view of a combined currency acceptor and magnetic card reader of the present invention.
Figure 2:
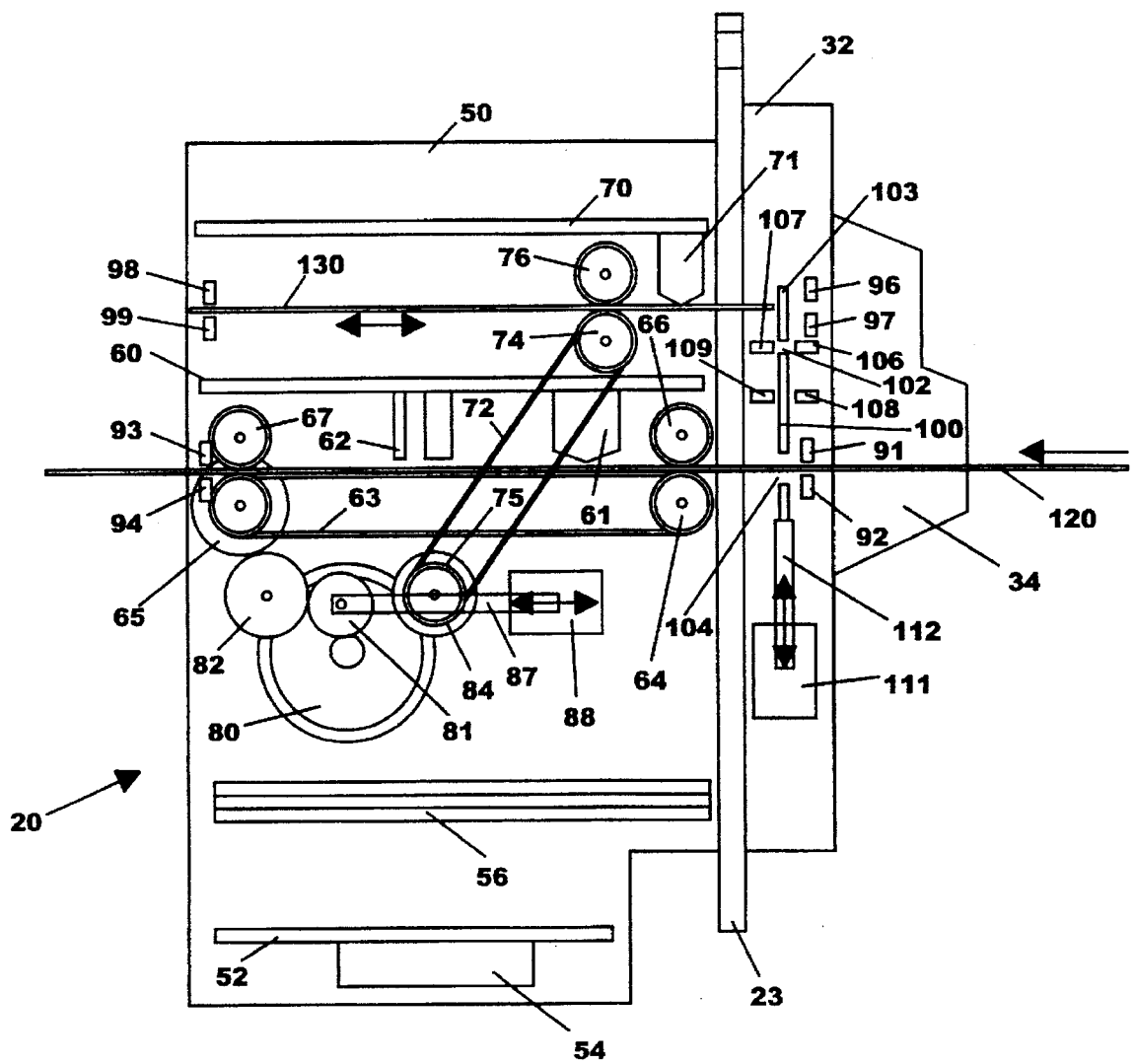
FIG. 2 shows a schematic representation of the electronic and mechanical elements used in the combined currency acceptor and magnetic card reader of the present invention with the mechanical elements in the currency inserting position.

The combined currency acceptor and magnetic card reader is shown at 20 in FIGS. 1 and 2. The combined currency acceptor and magnetic card reader 20 includes an acceptor main body 50 which is a generally rectangular body sized to fit in the space used by a conventional currency acceptor. The front of the acceptor main body 50 is provided with a mounting plate 23 for securing the combined currency acceptor and magnetic card reader 20 in the currency handling device (not shown). The mounting plate 23 includes two upper connector cutouts 25 and two lower connector cutouts 27 that receive screws (not shown). The two upper connector cutouts 25 and two lower connector cutouts 27 are positioned in the conventional orientation for currency acceptors currently on the market.

The front of the acceptor main body 50 has a currency opening 22 into which the user inserts currency to be accepted and validated by the combined currency acceptor and magnetic card reader 20. Also provided is a card opening 40 into which the user inserts a magnetic card to be read by the combined currency acceptor and magnetic card reader 20. There is also a light emitting diode 30 that preferably is a multi-colored red and green LED. The light emitting diode 30 is used to signal to various operating conditions of the magnetic card reader, for example, a blinking green light means the device is ready to operate, a steady green light means the magnetic card inserted into the card opening 40 is valid, a blinking red light means that the magnetic card is moving and a steady red light means that the magnetic card reader has malfunctioned in some manner.

FIG. 2 shows in a side view the electronic and mechanical elements of the combined currency acceptor and magnetic card reader 20. The front of the combined currency acceptor and magnetic card reader 20 includes a gate housing 32 in which are mounted the currency entry sensors 91,92; the magnetic card entry sensors 96,97; the currency gate 100, the currency gate solenoid 111 and the shaft 112. Just in front of the gate housing 32 is a display housing 34 in which are positioned the currency opening 22, the light emitting diode 30 and the card opening 40.

The acceptor main body 50 includes a central processing unit printed circuit board 52 with a microchip 54 which is programmed to handle whatever type of magnetic card is being used in the player tracking system and to handle whatever type of currency is being used. The central processing unit printed circuit board 52 could also be programmed to handle printed coupons in addition to currency. The acceptor main body 50 also includes a input/output printed circuit board 56 which electronically operates the combined currency acceptor and magnetic card reader 20.

A currency sensor printed circuit board 60 is provided which accepts and validates the incoming currency 120. The currency 120 is typically imprinted with a magnetic ink and a magnet (not shown) is used to magnetize the ink as is conventional so that the ink may be detected by a magnetic currency sensor 61 attached to the currency sensor printed circuit board 60. One or more optical currency sensors 62 also are provided to optically read the denomination of the currency 120. Any suitable currency detecting technology can be used to accept and validate the incoming currency such as Model DBV-135 distributed by Tekbilt, Inc., Huntingdon Valley, Pa.

The incoming currency 120 is drawn into the acceptor main body 50 by using a drive belt 63 which can be driven in either direction around the front wheel drive 64 and the rear wheel drive 65. A front idler wheel 66 cooperates with the front drive wheel 64 and a rear idler wheel 67 cooperates with the rear drive wheel 65 to maintain the currency 120 in a straight orientation as it passes through the acceptor main body 50. The rear wheel drive 65 is turned by connection to a currency drive gear 82 which in turn is driven by the selectable gear 81 rotated by the motor 80. Just behind the rear wheel drive 65 and rear idler wheel 67 are positioned the currency exit sensors 93,94.

Toward the upper area of the acceptor main body 50 there is provided a magnetic card printed circuit board 70 which includes a magnetic card reader head 71 for reading a magnetic card 130 inserted into the card opening 40. The movement of the magnetic card 130 is driven by an upper drive wheel 74 and an idler wheel 76. The upper drive wheel 74 can be rotated in either direction by the drive belt 72 which cooperates with the lower drive wheel 75. The lower drive wheel 75 is turned by the selectable gear 81 which is driven by the motor 80.

The selectable gear 81 is movable between it first position in operable relationship to the currency drive gear 82 to drive the drive belt 63 and its second position in operable relationship to the magnetic card drive gear 84 to drive the drive belt 72. These two selectable gear 81 positions are controlled by the shaft 87 connected to the solenoid 88.

The operation of the combined currency acceptor and magnetic card reader 20 will now be described. The currency receiving position of the combined currency acceptor and magnetic card reader 20 is shown in FIG. 2. The currency 120 is inserted into the currency opening 22 and the leading edge of the currency 120 is detected by the currency entry sensors 91,92. The currency entry sensors are preferably optical sensor elements with one being a transmitting sensor and the other being a receiving sensor. In order to ensure that the currency 120 is being inserted in a non-skewed manner, at least two sets of currency entry sensors 91,92 are suggested, aligned with each lateral edge of the currency 120. In the currency receiving position, the currency gate 100 is in the upper position which blocks the card opening 40 but aligns the currency slot 104 with the currency opening 22. A transmitting sensor 106 and a receiving sensor. 107 verify through sensing opening 102 that the card opening 40 is blocked by the magnetic card blocking portion 103 of the currency gate 100. The currency entry sensors send a signal through the central processing unit printed circuit board 52 and the input/output printed circuit board 56 to the solenoid 88 which positions the selectable gear 81 adjacent the currency drive gear 82. As the motor 80 turns, the drive belt 63 drives the currency 120 under the magnetic currency sensor 61 and the optical currency sensor 62. If the optical currency sensor 62 detects accepts and validates the currency 120, the drive belt 63 continues to drive the currency 120 through the acceptor main body 50 and into a currency stacking device (not shown). If the optical currency sensor 62 rejects the currency 120 as invalid, the motor 80 reverses and drives the currency 120 back out of the acceptor main body 50 through the currency opening 22.

Figure 3:
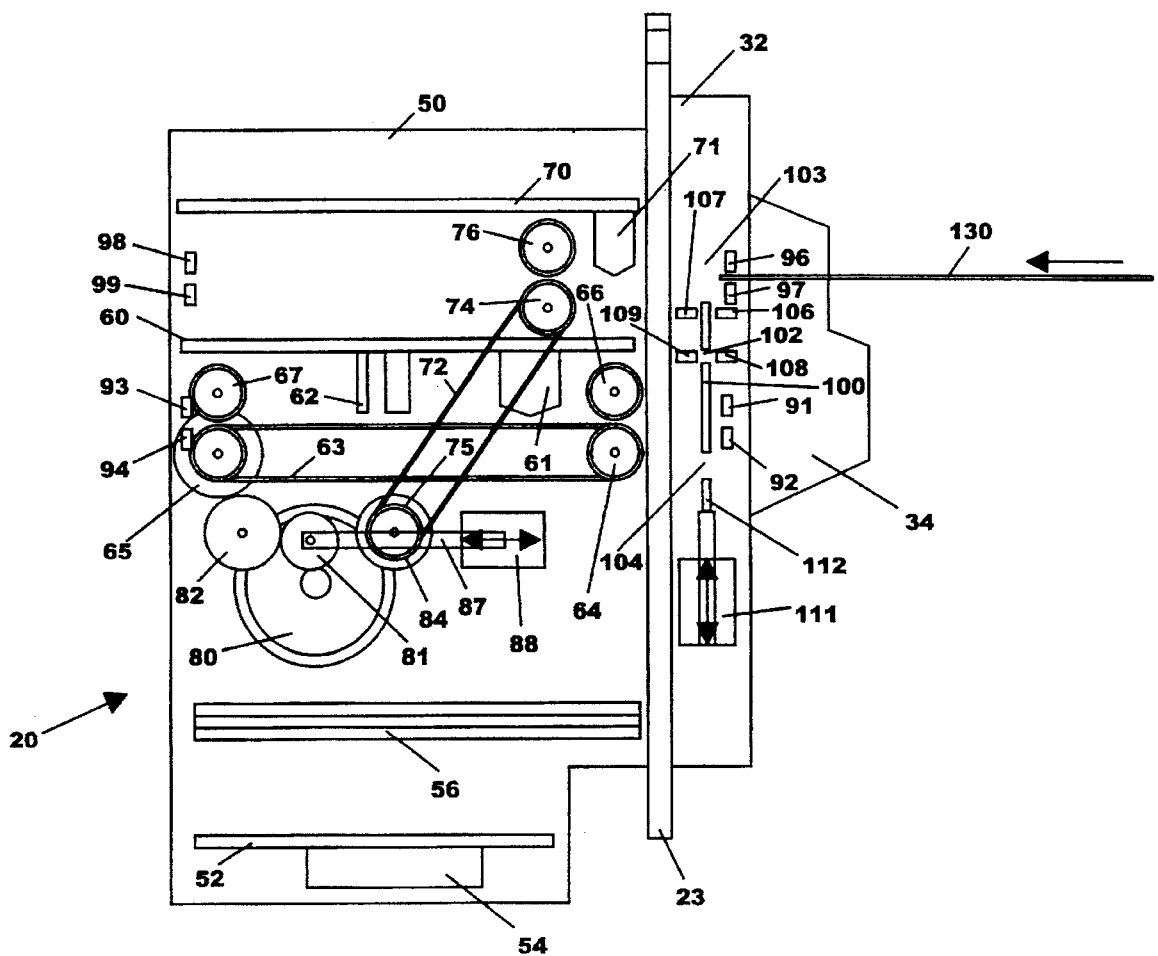
FIG. 3 shows a schematic representation of the electronic and mechanical elements used in the combined currency acceptor and magnetic card reader of the present invention with the mechanical elements in the magnetic card inserting position.

FIG. 3 shows the combined currency acceptor and magnetic card reader 20 positioned to receive a magnetic card 130. As the magnetic card 130 is inserted into the card opening 40 by the user, the magnetic card sensors 96,97 detect the leading edge of the magnetic card 130 and the currency gate solenoid 111 is activated to lower the currency gate 100. It its lowered position, the currency gate 100 blocks the currency opening 22 and lowers the magnetic card blocking portion below the level of the card opening 40 to allow complete insertion of the magnetic card 130. A transmitting sensor 108 and a receiving sensor 109 verify through sensing opening 102 that the card opening 40 is clear of the magnetic card blocking portion 103 of the currency gate 100. The detection of the leading edge of the magnetic card 130 by the magnetic card sensors 96,97 also sends a signal to the central processing unit printed circuit board 52 and microchip 54 which activates the solenoid 88 to move the selectable gear 81 to a position adjacent to the magnetic card drive gear 84. The motor 80 then causes the drive belt 72 to rotate about the upper drive wheel 74 and lower drive wheel 75 to draw the magnetic card 130 past the magnetic card reader head 71 of the magnetic card printed circuit board 70. If the magnetic card 130 is determined to be valid, the upper drive wheel 74 continues to drive the magnetic card 130 until the leading edge is detected by the magnetic card home sensors 98,99. When the magnetic card home sensors 98,99 detect the magnetic card 130, the currency gate solenoid 111 is activated to move the currency gate 100 into its upper position blocking the card opening 40 but allowing insertion of currency 120 into the combined currency acceptor and magnetic card reader 20.

Figure 4:
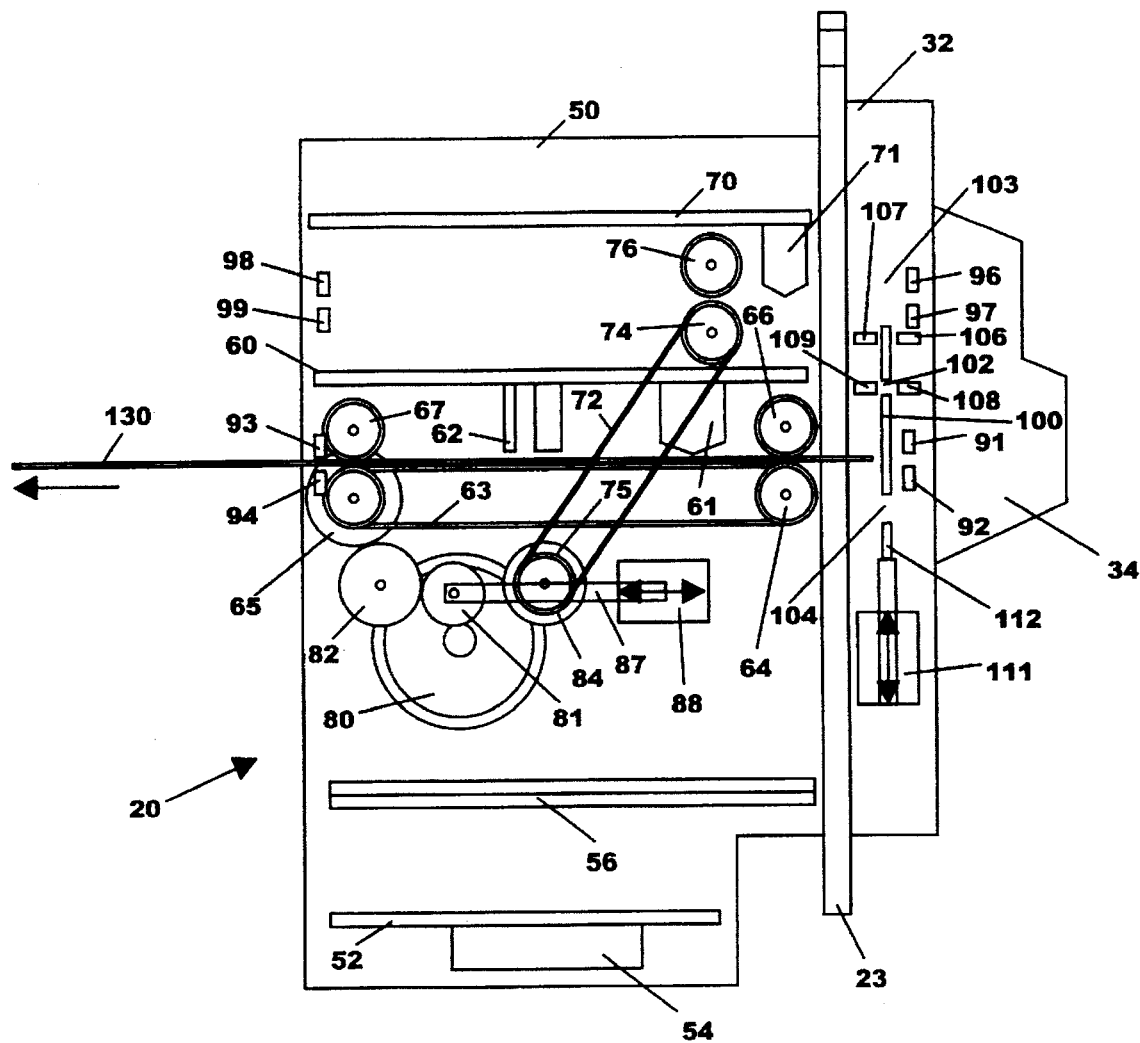
FIG. 4 shows a schematic representation of the electronic and mechanical elements used in the combined currency acceptor and magnetic card reader of the present invention with the mechanical elements positioned in the currency validating position.

FIG. 4 shows the acceptor main body 50 with the mechanical elements positioned in the currency validating position. If the optical currency sensor 62 determines that the currency 120 is valid, the entire length of the currency 120 is drawn into the acceptor main body 50 and a signal is sent to the currency gate solenoid 111 to lower the currency gate 100 which closes the currency opening 22. This functions as an anti-stringing device to prevent the user from removal the currency 120 after validation has occurred. The currency 120 is continued to be driven through the acceptor main body 50 and when the trailing end of the currency 120 passes through the bill exit sensors 93,94, a signal is sent to the currency gate solenoid 111 which raises the currency gate 100 to allow insertion of the next currency 120.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

What is claimed is:

1. A combined currency acceptor and magnetic card reader for receiving and validating currency and for receiving and reading a magnetic card comprising:

a) an acceptor main body including a mounting plate for attaching the combined currency acceptor and magnetic card reader to a gaming machine;

b) a gate housing attached to the mounting plate and including a currency gate movable by a solenoid;

c) a display housing attached to the gate housing and including a currency opening, a magnetic card opening and a light emitting diode display;

d) means for driving the currency into the main body;

e) means for activating the currency gate to close the magnetic card opening when currency is being inserted;

f) means for validating the currency and for closing the currency opening when the currency is accepted as valid; and g) means for reading the magnetic card and for closing the magnetic card opening when the magnetic card is read as valid.

2. A combined currency acceptor and magnetic card reader for receiving and validating currency and for receiving and reading a magnetic card comprising:

a) an acceptor main body including a mounting plate for attaching the combined currency acceptor and magnetic card reader to a gaming machine;

b) a gate housing attached to the mounting plate and including a currency gate movable by a solenoid;

c) a display housing attached to the gate housing and including a currency opening, a magnetic card opening and a light emitting diode display;

d) means for driving the currency into the main body;

e) means for activating the currency gate to close the magnetic card opening when currency is being inserted and for closing the currency opening when a magnetic card is being inserted;

f) means for validating the currency and for closing the currency opening when the currency is accepted as valid; and g) means for reading the magnetic card and for closing the magnetic card opening when the magnetic card is read as valid.

* * * * *